United States Patent
Uemura et al.

[11] Patent Number: 6,164,662
[45] Date of Patent: Dec. 26, 2000

[54] METAL GASKET

[75] Inventors: Hiroshi Uemura; Tomoyoshi Ogaeri; Kenji Ishida; Kunitoshi Inoue, all of Osaka-fu, Japan

[73] Assignee: Nippon Gasket Co. Ltd., Osaka-fu, Japan

[21] Appl. No.: 09/033,858

[22] Filed: Mar. 3, 1998

[30] Foreign Application Priority Data

Mar. 18, 1997 [JP] Japan ................................. 9-083418

[51] Int. Cl.$^7$ ................................. F02F 11/00
[52] U.S. Cl. ................................. 277/593; 277/594
[58] Field of Search ................................. 277/592, 593, 277/594, 595

[56] References Cited

U.S. PATENT DOCUMENTS

| | | | |
|---|---|---|---|
| 5,586,776 | 12/1996 | Kubouchi et al. | 277/595 |
| 5,609,345 | 3/1997 | Miura et al. | 277/593 |
| 5,690,343 | 11/1997 | Takada et al. | 277/595 |

FOREIGN PATENT DOCUMENTS 08-06150  3/1996  Japan.

*Primary Examiner*—Anthony Knight
*Assistant Examiner*—Karlena D. Schwing
*Attorney, Agent, or Firm*—Browdy & Neimark

[57] ABSTRACT

An engine gasket flattens the surface pressure occurring around holes, prevents the occurrence of impressions in and damage to a cylinder block and a cylinder head, and secures a stable sealing performance. This metal gasket has elastic metal plates and an intermediate metal plate interposed between these elastic metal plates. The elastic metal plates are provided with full beads along the circumferences of the holes so that the ridge portions of the full beads contact the intermediate metal plate. The intermediate plate has, on regions which are between the holes and full beads of the elastic metal plates, half beads extending toward the elastic metal plates. The elastic metal plates are folded back along the circumferences of the holes.

9 Claims, 5 Drawing Sheets

METAL GASKET

BACKGROUND OF THE INVENTION

1. Field of the Invention

This invention relates to a metal gasket used to seal a clearance between opposed surfaces of parts of a multicylinder engine.

2. Description of the Prior Art

A metal gasket formed out of a metallic material has heretofore been used to seal a clearance between opposed surfaces of a cylinder head and a cylinder block of an engine. In a recent engine, the attaining of a higher output and the reduction of the weight have been demanded, and a cylinder head and a cylinder block have a tendency to be formed out of an aluminum material of a small specific gravity instead of steel and a cast conventionally used, for meeting the demand. The aluminum engine structural members have a small weight but a lower rigidity, so that the relative displacement of a cylinder head and a cylinder block during an operation of the engine tends to increase.

Various types of metal gaskets for sealing a clearance between opposed surfaces of the two structural members have been provided. A metal gasket is provided with beads formed along the portions thereof opposed to the circumferences of cylinder bores (combustion chambers) and passages for water and oil, and these beads form annular elastic contact portions with respect to the opposed surfaces when the cylinder head and cylinder block are tightened and fixed by bolts so as to seal a clearance between the opposed surfaces of the two parts.

During the combustion cycles of an engine, the height of a clearance between the cylinder head and cylinder block increases and decreases repeatedly, and stress, i.e. mechanical stress and thermal stress are exerted repeatedly on a metal cylinder head gasket. The load fluctuation stress of an engine shows a high value in the portions of the cylinder block which have the lowest rigidity. Consequently, permanent set in fatigue and cracks occur in the beads formed on a bead base plate, and the sealing performance of the metal gasket is deteriorated.

A conventional metal cylinder head gasket is disclosed in Japanese patent Laid-Open No. 61506/1996. This metal cylinder head gasket is formed by laminating in order a bead base plate provided with beads along the circumferences of holes and comprising an elastic metal plate, a regulating plate provided with beads along the circumferences of holes and comprising an elastic metal plate, and a hole-carrying grommet plate, the inner circumferences of the holes of the regulating plate being held and fixed by the grommet plate to form parallel-arranged holes, the portions of the beads on the bead base plate which are between adjacent holes comprising full beads, the portions of the beads on the same plate which extend along the remaining parts of the circumferences of the holes comprising half beads, the beads on the regulating plate comprising full beads extending along the whole of the circumferences of the holes, the bead base plate being laminated on the regulating plate so that the beads on the former plate are superposed on those on the latter plate in the regions thereof which are between adjacent holes.

In a metal gasket, it is preferable to concentrate a surface pressure (face-to-face pressure) to a certain extent on the regions thereof which are around combustion chamber holes, and thereby secure an average surface pressure condition in which a necessary surface pressure is secured around the water holes and oil holes, for the purpose of improving the surface pressure balance and sealability of the gasket.

However, in the conventional metal gasket, the surface pressure is concentrated excessively on the grommet portions, and a necessary surface pressure cannot be secured around the water holes and oil holes. Consequently, securing an average surface pressure becomes difficult, and an excellent sealed condition cannot be maintained. When the surface pressure concentration occurs in the bead-formed portions of a metal gasket, a surface pressure balance is deteriorated, and the sealability thereof lowers.

In a conventional metal gasket, the projecting surfaces of the beads directly contact a cylinder head or a cylinder block when the gasket is inserted between the cylinder head and cylinder block and tightened therebetween, and the regions alone in which the projecting surfaces of the beads contact the cylinder head or cylinder block generate a high surface pressure linearly. Therefore, impressions and breakage occur in the portions of the cylinder block or cylinder head which the projecting surfaces of the beads contact, and, moreover, the sealing performance of the gasket lowers.

SUMMARY OF THE INVENTION

The present invention relates to a metal gasket having a first elastic metal plate provided with first parallel-arranged holes, a second elastic metal plate provided with second holes opposed to the first holes, and an intermediate metal plate interposed between the first and second elastic metal plates and provided with third holes opposed to the first and second holes, the first elastic metal plates being provided with full beads extending along the circumferences of the first holes, in such a manner that the projecting portions of the beads contact the intermediate metal plate, the intermediate metal plate being provided at the portions thereof which are between the first holes and full beads of the first elastic metal plate with half beads extending toward the first elastic metal plate, the second elastic metal plate being provided with folded portions folded back along the circumferences of the second holes.

The thickness of the intermediate metal plate is set 2–5 times as large as that of the first elastic metal plate. The thickness of the second elastic metal plate is set smaller than that of the first elastic metal plate.

The height of the full beads formed on the first elastic metal plate is set larger than that of the half beads formed on the intermediate metal plate. The height of the half beads formed on the intermediate metal plate is set larger than the thickness of the sections of the second elastic metal plate at which the folded portions are formed.

Therefore, the height of the half beads, which form stoppers, on the intermediate metal plate with respect to the main surface thereof is smaller than that of the full beads on the elastic metal plate. Accordingly, the stoppers have a high rigidity, though they comprise half beads, and, even when the half beads are deformed by a gasket tightening force, the function thereof as stoppers is not spoiled.

A distance between an inner border of a half bead formed on the intermediate metal plate and a relative third hole is set larger than a width of a folded portion formed on the second elastic metal plate, and, moreover, a front end of the folded portion and the inner border of the half bead are not superposed on each other in a gasket-tightened state.

The positions of the inner borders of the full beads formed on the first elastic metal plate and those of the outer borders of the half beads formed on the intermediate metal plate are substantially opposed to each other.

The first and second elastic metal plates are provided with half beads along the circumferences of the outer circumferential portions, water holes, oil holes, bolt holes and knock holes. The portions of the intermediate metal plate which are in the vicinity of the outer circumferential portion, water holes, oil holes, bolt holes and knock holes are formed flat.

The folded surfaces of the folded portions of the second elastic metal plate hold soft metal members therein, or are coated with heat resisting rubber or a heat resisting resin.

The folded surfaces of the folded portions formed on the second elastic metal plate is provided with clearances.

Since this metal gasket is formed as described above, the stoppers formed of the half beads of the intermediate metal plate prevent a full compression of the full beads of one of the opposed elastic metal plates, and compensating portions having a function of offsetting the irregularity of opposed fixing surfaces of parts and a sealing function for protecting the full beads are formed.

Between the intermediate metal plate and second elastic metal plate, folded portions are provided, the folded surfaces holding inserted members therein or embracing clearances there within. Accordingly, the relative displacement and irregularity of the plates are offset satisfactorily, and impressions in and damage to the cylinder head and cylinder block due to the folded portions do not occur.

The leveling of the surface pressure liable to be concentrated around the holes of the second elastic metal plate can be regulated by controlling the folding direction of the folded portions and the height of the clearances between the folded surfaces thereof, or by inserting soft members into these clearances.

The surface pressure occurring in the second elastic metal plate can be leveled by forming the folded portions of the same elastic metal plate and the half beads of the intermediate metal plate to proper shapes. The folded portions of the second elastic metal plate cooperate with the half beads of the intermediate metal plate and fulfil the function of generating surface pressure applied to both surfaces of the metal gasket, whereby the leveling of surface pressure can be attained.

The surface pressure occurring in the first elastic metal plate can be leveled by forming the full beads of the same metal plate and half beads of the intermediate metal plate to proper shapes. The half beads of the intermediate metal plate can prevent a full compression of the full beads of the first elastic metal plate, and fulfil the function of generating surface pressure applied to both surfaces of the metal gasket.

In this metal gasket, a surface pressure value of the portions around the holes becomes comparatively constant owing to the flat surfaces of the first elastic metal plate which are on the side of the first holes and extending toward the beads of the first elastic metal plate, the folded portions of the second elastic metal plate, and the flat surfaces of the intermediate metal plate which are on the side of the third holes and extending toward the half beads thereof as mentioned above, so that the sealing performance of the gasket can be improved. Since the intermediate metal plate is provided with half beads, the surface pressure of the regions thereof which are closer to the holes than to the half beads becomes proper, so that the beads can be protected by preventing the entry of a high-temperature gas into the beads of the first elastic metal plate. Moreover, when the folded portions are provided on the second elastic metal plate, positions in which the folded portions are not superposed on the half beads of the intermediate metal plate have only to be selected. The full beads and half beads may be formed so that the inner borders of the full beads of the first elastic metal plate and the outer borders of the half beads of the intermediate metal plate are substantially aligned with each other.

This metal gasket has the above-described structure, and is used by being inserted between a cylinder head and a cylinder block fixed to the cylinder head, the first elastic metal plate being disposed so as to face the cylinder head, the second elastic metal plate being disposed so as to face the cylinder block.

This metal gasket is capable of leveling the surface pressure on the portions thereof which are around the holes. Both the cylinder block and cylinder head are formed out of an aluminum material, and, even if the relative displacement thereof increases, or, even if irregularity occurs therebetween, the relative displacement and irregularity are offset satisfactorily, so that an excellent sealing performance can be displayed. The folded portions are positioned between the intermediate metal plate and an elastic metal plate, inserted members or hollow clearances are provided in the folded portions, so that impressions in and damage to the cylinder block and cylinder head do not occur.

When this metal gasket is tightened between a cylinder head and a cylinder block, the first elastic metal plate held between the opposed fixing surfaces of the two engine parts is brought gradually into contact with the intermediate metal plate with the full beads bent, and the folded portions of the second elastic metal plate are brought gradually into contact with the intermediate metal plate. In the compressed condition with the gasket tightening force applied to the metal plates, the half beads of the intermediate plate offset the irregularity of the clearance between the intermediate metal plate and the elastic metal plate to prevent a full compression of the full beads and reduce the stress fluctuation of the full beads, whereby the preventing of the entry of a high-temperature gas into the full beads of the elastic metal plate and the protecting of the full beads can be done.

Accordingly, after the two elastic metal plates have contacted the stoppers comprising half beads opposed to the elastic metal plates at both surfaces of the intermediate metal plate, the amount of displacement of the elastic metal plates is limited. Namely, the elastic metal plates are not deformed to the degree of a complete compression, i.e., to such an extent that the full beads are completely crushed, so that the elastic effect of the full beads remains. Therefore, the function of offsetting the irregularity of the opposed surfaces of the cylinder head and cylinder block also remains.

DESCRIPTION OF THE PREFERRED EMBODIMENTS

The embodiments of the metal gasket according to the present invention will now be described with reference to the drawings.

Figure 3:
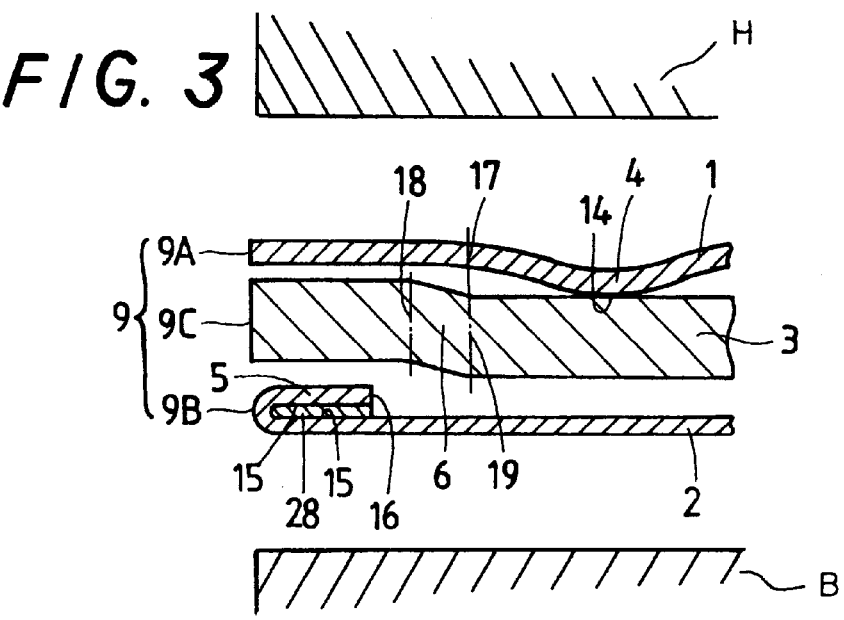
FIG. 3 is a partial enlarged sectional view showing another embodiment of the metal gasket taken along a line corresponding to the line A—A in FIG. 1.

This metal gasket is used by being inserted between the opposed surfaces of, for example, a cylinder block and a cylinder head. An elastic metal plate 1 is disposed so as to face a cylinder head, and an elastic metal plate 2 so as to face a cylinder block. This metal gasket is held between a cylinder head and a cylinder block, and seals a clearance between the opposed fixing surfaces thereof. In FIG. 3 the cylinder head is denoted by H, and the block by B.

This metal gasket is applied to a multicylinder engine, such as a 4-cylinder engine and a 6-cylinder engine, and provided at the portions thereof which correspond to bores of cylinders in a cylinder block with cylinder bore holes, i.e. a plurality of holes arranged in parallel.

In this metal gasket, holes 9A are provided in the elastic metal plate 1, holes 9B in the elastic metal plate 2, and holes 9C in an intermediate metal plate 3, and the holes 9A, 9B, 9C (these holes are generally designated by a reference numeral 9) are formed in alignment with one another. Around the holes 9, various kinds of holes, such as water holes 10, oil holes 11, bolt holes 12, and knock holes 13 are provided.

This metal gasket has mainly a first elastic metal plate 1 provided with a plurality of parallel-arranged first holes 9A, a second elastic metal plate 2 provided with second holes 9B opposed to the holes 9A, and an intermediate metal plate 3 interposed between the elastic metal plates 1, 2 and provided with third holes 9C opposed to the holes 9A, 9B. The elastic metal plate 1 is provided with full beads 4 extending along the circumferences of the holes 9A, and projecting portions 14 of the beads 4 are engaged with the intermediate metal plate 3. The intermediate metal plate 3 is provided at the portions thereof which are opposed to intermediate regions between the circumferences of the holes 9A and full beads 4 of the elastic metal plate 1 with half beads 6 extending toward the elastic metal plate 1 and holes 9C. The elastic metal plate 2 is provided with folded portions 5 bent along the circumferences of the holes 9B. The intermediate metal 3 is formed flat except the portions thereof which are around the circumferences of the holes 9C and provided with half beads 6.

Figure 5:
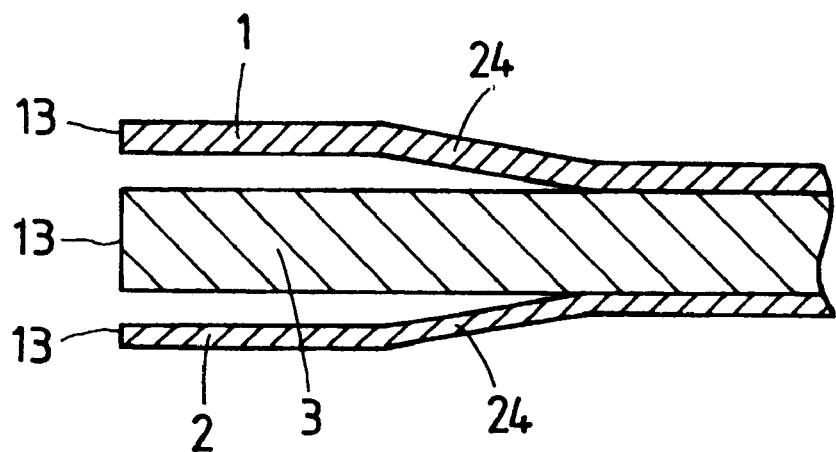
FIG. 5 is an enlarged sectional view concerning a knock hole taken along the line B—B in FIG. 1.
Figure 6:
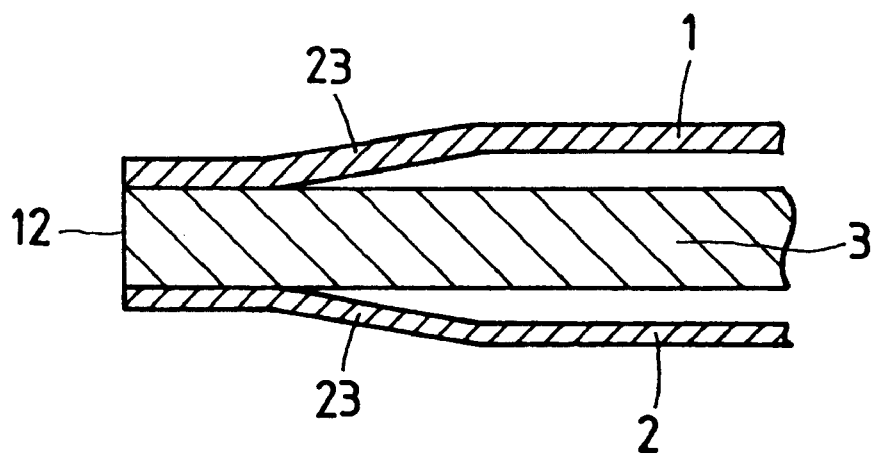
FIG. 6 is an enlarged sectional view concerning a bolt hole taken along the line C—C in FIG. 1.
Figure 7:
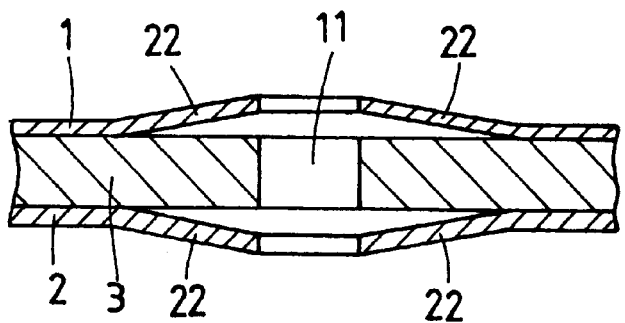
FIG. 7 is an enlarged sectional view concerning an oil hole taken along the line D—D in FIG. 1.
Figure 8:
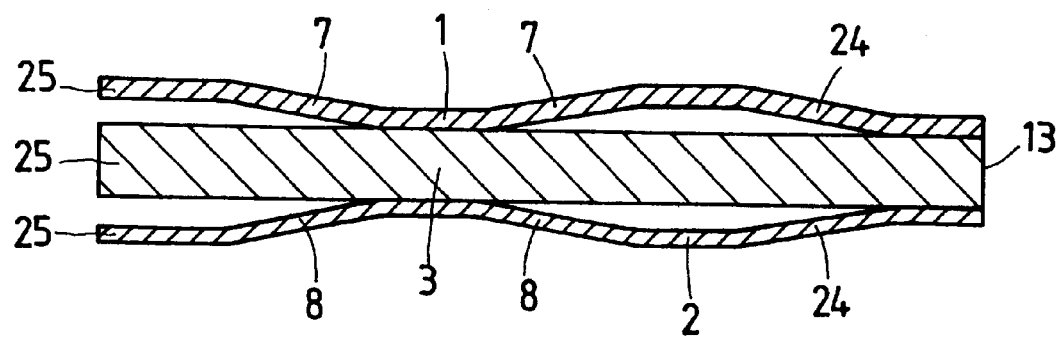
FIG. 8 is an enlarged sectional view concerning a circumferential portion and a bolt hole taken along the line E—E in FIG. 1.
Figure 9:
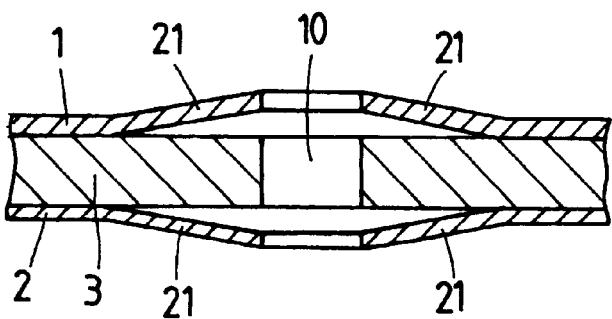
FIG. 9 is an enlarged sectional view concerning a water hole taken along the line F—F in FIG. 1.
Figure 10:
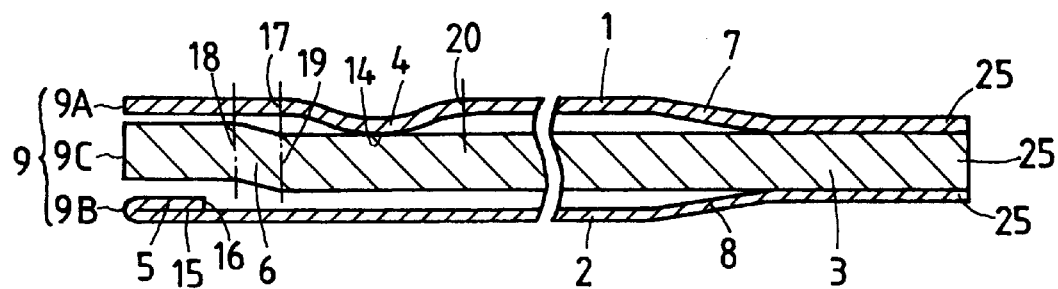
FIG. 10 is an enlarged sectional view concerning a hole and a circumferential portion taken along the line J—J in FIG. 1.

In this metal gasket, the elastic metal plates 1, 2 are provided with half beads 24 along the circumferences of the knock holes 13 as shown in FIG. 5, and also half beads 23 along the circumferences of the bolt holes 12 as shown in FIG. 6. The elastic metal plates 1, 2 are provided with half beads 22 along the circumferences of the oil holes 11 as shown in FIG. 7. The elastic metal plate 1 is provided with half beads 7 along its outer circumferential portion 25 as shown in FIGS. 8 and 10. The elastic metal plate 2 is provided with half beads 8 along its outer circumferential portion 25 as shown in FIGS. 8 and 10. The elastic metal plates 1, 2 are further provided with half beads 21 along the circumferences of the water holes 10 as shown in FIG. 9.

In this metal gasket, the thickness $t_3$ of the intermediate metal plate 3 is set 2–5 times as large as that $t_1$ of the elastic metal plate 1 ($t_3 > t_1$). The thickness $t_2$ of the elastic metal plate 2 is set smaller than $t_1$ of the elastic metal plate 1 ($t_2 < t_1$). A total thickness $t_4$ of each folded portion 5 of the elastic metal plate 2 is set equal to or larger than two times that $t_2$ of the elastic metal plate 2 ($t_4 \geq 2t_2$). The height $h_1$ of each full bead 4 formed on the elastic metal plate 1 is set larger than that $h_2$ of each half bead 6 formed on the intermediate metal plate 3. In this metal gasket, the height $h_2$ of each half bead 6 formed on the intermediate metal plate 3 is set larger than that $h_3$ of the portion of the elastic metal plate 2 which forms a folded portion 5 ($h_3 = t_4 - t_2$). Namely, the relational expression $h_1 > h_2 > h_3$ is established.

A width $W_1$ of a region between an inner border 18 of a half bead 6 formed on the intermediate metal plate 3 and a hole 9 is set larger than that $W_2$ of a folded portion 5 formed on the elastic metal plate 2 ($W_1 > W_2$), and a front end 16 of a folded portion and the inner border 18 of a half bead 6 are formed so that they are not superposed on each other when the metal plates are compressed. The position of an inner border 17 of a full bead 4 formed on the elastic metal plate 1 and that of an outer border 19 of a half bead 6 formed on the intermediate plate 3 are substantially aligned with each other. Accordingly, the half beads 6 of the intermediate metal plate 3 in a compressed state are not superposed on the beads 4 of the elastic metal plate 1. Namely, a full compression of the beads 4 is avoided, and the sealing function of the half beads 6 with respect to the beads 4 is displayed.

The relation between the elastic metal plate 1, intermediate metal plate 3 and elastic metal plate 2 in this metal gasket can be set, for example, as follows. The elastic metal plate 1 is formed out of SUS301, the Vickers' hardness of which is Hv 350–420. The elastic metal plate 2 is formed out of SUS304, the Vickers' hardness of which is Hv 150–200. The intermediate metal plate 3 is formed out of SECC or SUS430, the Vickers' hardness of which is Hv 120–200. The elastic metal plate 1 has a thickness of 0.2–0.3 mm (0.2 mm in the embodiments), a height of a full bead 4 extending around a hole of 0.22 mm and a width of a full bead 4 of 2.5 mm. The height of the half beads 7, 21–24 formed on the circumferential portion 25 and around the water holes 10, oil holes 11, bolt holes 12 and knock holes 13 is 0.2 mm, and the width thereof 1.5 mm. The elastic metal plate 2 has a thickness of 0.1–0.15 mm (0.12 mm in the embodiments), a height of the folded portions 5 around the holes of 0.2–0.3 mm (0.3 mm in the embodiments), and a width of the folded portions of 1.4 mm. The height of the half beads 7, 8, 21–24 formed on the outer circumferential portion 25, and around water holes 10, oil holes 11, bolt holes 12 and knock holes 13 of the elastic metal plate 2 is 0.2 mm, and a width thereof 1.5 mm. The intermediate metal plate 3 has a thickness of 0.4–1 mm (0.8 mm in the embodiments), a height of the half beads 6 around the holes of 0.15 mm, and a width of the half beads 6 of 1.4 mm.

Figure 1:
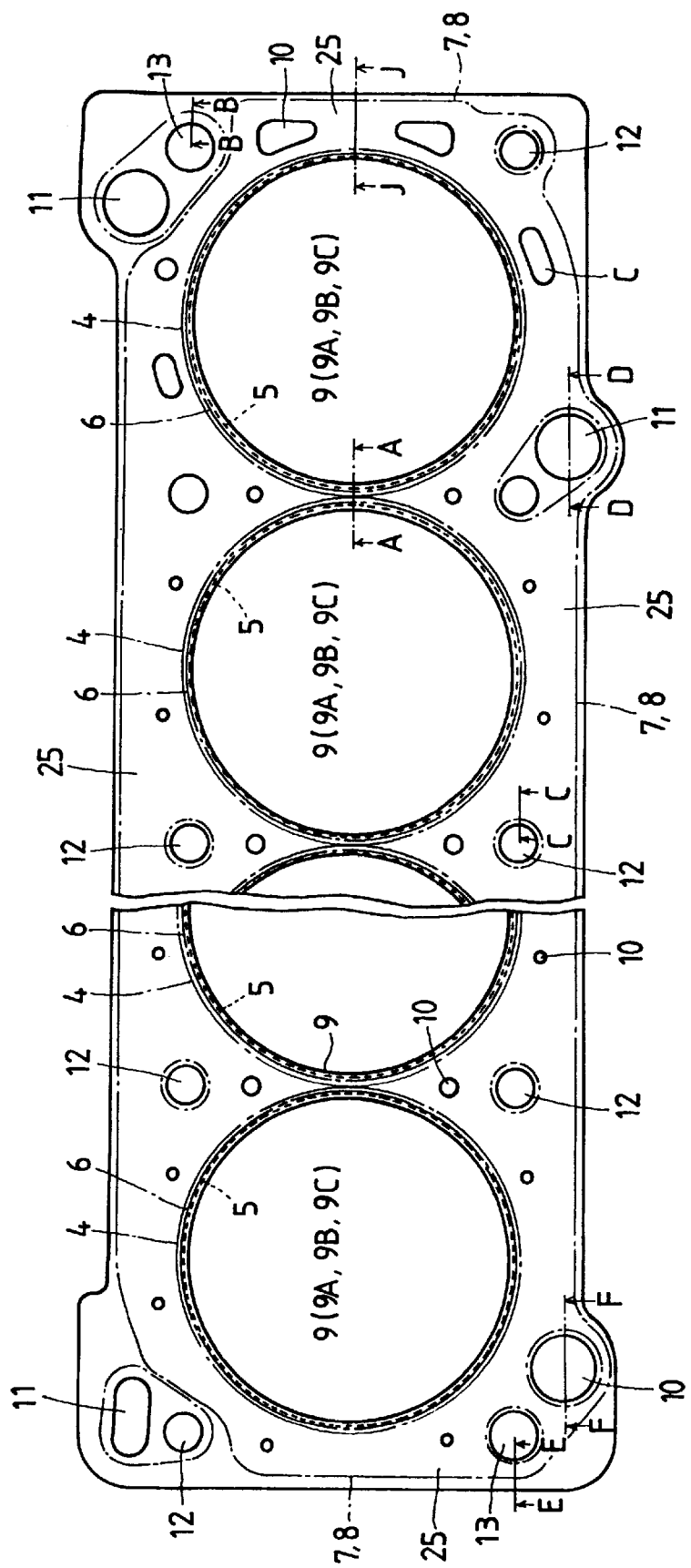
FIG. 1 is a partial plan view showing an embodiment of the metal gasket according to the present invention.
Figure 2:
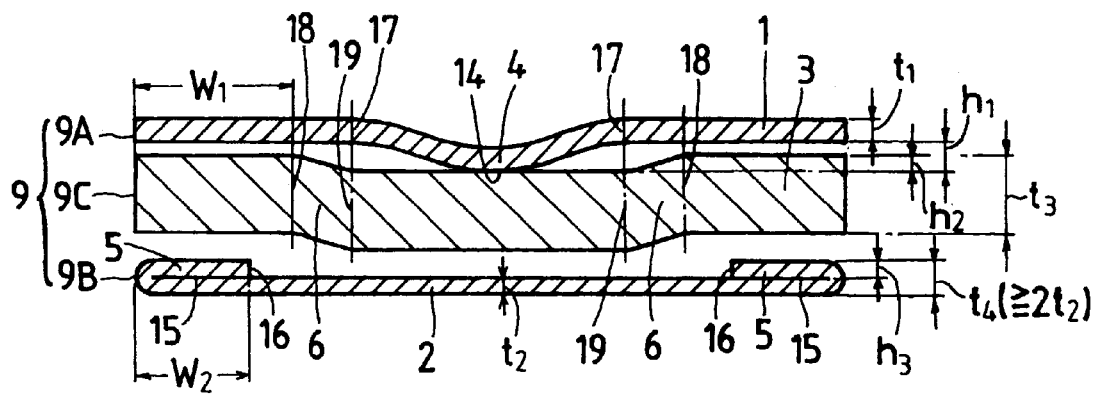
FIG. 2 is a partial enlarged sectional view showing the same embodiment and taken along the line A—A in FIG. 1.
Figure 4:
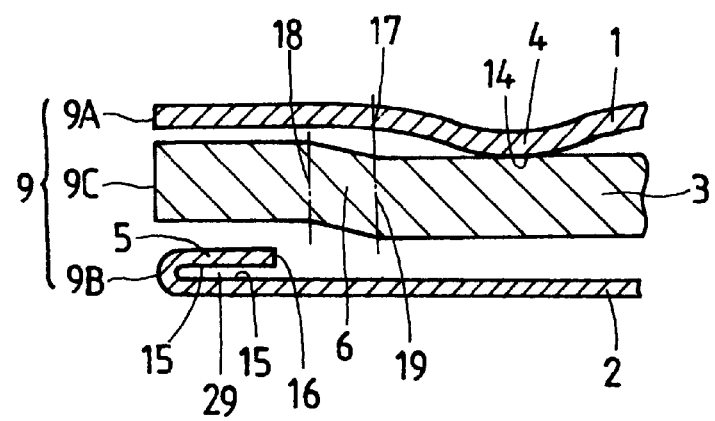
FIG. 4 is a partial enlarged sectional view showing still another embodiment of the metal gasket taken along a line corresponding to the line A—A in FIG. 1.
Figure 11:
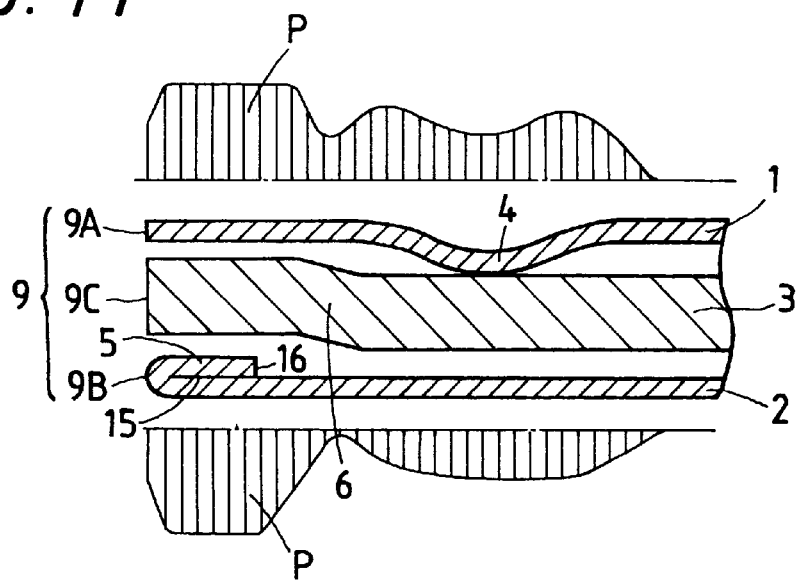
FIG. 11 is an explanatory view showing the condition of a surface pressure occurring around a hole.

Each of the folded portions 5 of the elastic metal plate 2 holds a soft metal member 28 between the folded surfaces 15 thereof as shown in FIG. 3, or the folded surfaces 15 are coated with heat resisting rubber or a heat resisting resin. In another example, a clearance 29 is formed as shown in FIG. 4, between the folded surfaces 15 of each of the folded portions of the elastic metal plate 2. In this metal gasket, each folded portion 5 of the elastic metal plate 2 is engaged directly at its folded surfaces 15 with each other as shown in FIG. 2, or a soft metal member 28 is inserted in the folded portion 5 of the elastic metal plate 2 as shown in FIG. 3, or a clearance 29 is formed between the folded surfaces 15 of the folded portion 5 of the elastic metal plate 2 as shown in FIG. 4, whereby it becomes possible to flatten the surface pressure occurring around the holes 9 as shown in FIG. 11, and improve the sealing performance of the gasket without causing impressions and damage to occur in and to the engine parts between which this metal gasket is inserted.

Figure 12:
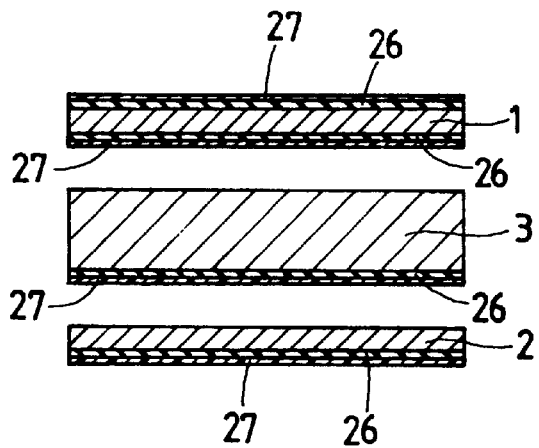
FIG. 12 is an explanatory sectional view showing a surface treatment for two elastic metal plate and an intermediate metal plate.

As shown in FIG. 12, the elastic metal plates 1, 2 are coated at the surfaces thereof with a heat resisting and oil resisting non-metallic material to a thickness of, for example, around 10–50 μm, whereby the avoiding of metal-to-metal contact of these plates with respect to the cylinder head and cylinder block, and the securing of the corrosion resistance, durability and strength of the elastic metal plates are attained. The intermediate metal plate 3 is formed out of a metal softer than the metals out of which the elastic metal plates 1, 2 are formed. For example, the elastic metal plate 1 is formed out of SUS301, the elastic metal plate 2 SUS304, and the intermediate metal plate 3 which constitutes a regulating plate SUS430 or SECC (a soft steel plate). The upper and lower surfaces of the elastic metal plates 1, 2 are coated with fluororubber 26 having a heat resistance and an oil resistance, and the surfaces of the fluororubber 26 is further coated with an acrylic silicone resin 27. The non-metallic material with which the elastic metal plates 1, 2 are coated covers fine recesses and projections formed, if any, during the machining of these metal plates, and fulfils a sealing function satisfactorily.

Since this metal gasket is formed as described above, the following functions can be displayed. In this gasket, the surface pressure occurring in the vicinity of the circumferential regions of the holes 9 becomes substantially flat as shown by a letter P in FIG. 11, so that impressions and damage in and to the cylinder head and cylinder block due to the full beads 4, folded portions 5 and half beads 6 do not occur, a stable sealing performance being able to be displayed. When the height of the clearances 29 in the folded portions 5 of the elastic metal plate 2, folding direction of the folded portions 5, or the thickness of the soft metal members 28 is regulated, the flattening of the surface pressure occurring around the holes 9 can be attained.

The surface pressure on the upper surface of the metal gasket can be flattened by the full beads 4 of the elastic metal plate 1 and the half beads 6 of the intermediate metal plate 3, while the surface pressure on the lower surface of the metal gasket can be flattened by the folded portions 5 of the elastic metal plate 2 and half beads 6 of the intermediate metal plate 3. The half beads 6 of the intermediate metal plate 3 prevents a full compression of the full beads 4 of the elastic metal 1, whereby it becomes possible to avoid the occurrence of permanent set in fatigue of the full beads 4, and fulfil the function of generating surface pressures on the upper and lower surfaces of the metal gasket. The folded portions 5 of the elastic metal plate 2 cooperate with the half beads 6 of the intermediate metal plate 3 to enable the fulfiling of the function of generating surface pressures applied to the upper and lower surfaces of the metal gasket, and the flattening of the surface pressures to be effected.

What is claimed is:

1. A metal gasket comprising a first elastic metal plate including first parallel-arranged holes, a second elastic metal plate including second holes opposed to said first holes, and an intermediate metal plate interposed between said first and second elastic metal plates and including third holes opposed to said first and second holes, said first elastic metal plate including full beads extending along the circumferences of said first holes, in such a manner that projecting portions of said full beads contact said intermediate metal plate, said intermediate metal plate including at portions thereof which are between said first holes and said full beads of said first elastic metal plate first half beads extending toward said first elastic metal plate, said second elastic metal plate being provided with folded portions folded back, along the circumferences of said second holes;

wherein the thickness of said intermediate metal plate is 2–5 times as large as that of said first elastic metal plate;

wherein the thickness of said second elastic metal plate is smaller than that of said first elastic metal plate;

wherein the height of said full beads formed on said first elastic metal plate is larger than that of said first half beads formed on said intermediate metal plate; and wherein the height of said first half beads formed on said intermediate metal plate is larger than the thickness of regions of said second elastic metal plate on which said folded portions are formed.

2. The metal gasket according to claim 1, wherein said first and second elastic metal plates and said intermediate metal plate are provided with water holes, oil holes, bolt holes and knock holes, said first and second elastic metal plates that are other than said intermediate metal plate being provided with second half beads on outer circumferential portions thereof and along the circumferences of said water holes, oil holes, bolt holes and knock holes.

3. The metal gasket according to claim 1, wherein a distance between inner borders of said first half beads formed on said intermediate metal plate and said third holes is set larger than the width of said folded portions formed on said second elastic metal plate, ends of said folded portions and said inner borders of said first half beads being not superposed on each other when said gasket is in a tightened state.

4. The metal gasket according to claim 1, wherein positions of inner borders of said full beads formed on said first elastic metal plate and positions of outer borders of said first half beads formed on said intermediate metal plate are substantially opposed to each other.

5. The metal gasket according to claim 1, wherein soft metal members are inserted between folded surfaces of said folded portions of said second elastic metal plate.

6. The metal gasket according to claim 1, wherein said folded surfaces of said folded portions of said second elastic metal plate are coated with heat resisting rubber or a heat resisting resin.

7. The metal gasket according to claim 1, wherein clearances are formed between said folded surfaces of folded portions of said second elastic metal plate.

8. The metal gasket according to claim 1, wherein the first parallel-arranged holes, second holes, and third holes are adapted to seal cylinder holes in a cylinder head and a cylinder block, and wherein the metal gasket comprises means to be interposed between the cylinder head and cylinder block, said means comprising an orientation of the gasket wherein the first elastic metal plate faces the cylinder block and the second elastic metal plate faces the cylinder head.

9. The metal gasket according to claim 1, wherein the folded portions are folded back along the circumferences of said second holes onto a remaining portion of the second elastic metal plate.

* * * * *